United States Patent
Osada et al.

(10) Patent No.: US 8,105,726 B2
(45) Date of Patent: Jan. 31, 2012

(54) FUEL CELL SEPARATOR, METHOD OF MANUFACTURING FUEL CELL SEPARATOR, AND FUEL CELL

(75) Inventors: Kazuhiro Osada, Toyota (JP); Masahiro Kida, Nagoya (JP); Shungo Fukumoto, Tajiimi (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 539 days.

(21) Appl. No.: 11/907,888

(22) Filed: Oct. 18, 2007

(65) Prior Publication Data

US 2009/0130537 A1 May 21, 2009

(30) Foreign Application Priority Data

Nov. 28, 2006 (JP) ................................. 2006-320745

(51) Int. Cl.
H01M 2/14 (2006.01)
H01M 8/02 (2006.01)

(52) U.S. Cl. .................... 429/457; 427/115; 427/569

(58) Field of Classification Search .................... 429/38, 429/457

See application file for complete search history.

(56) References Cited

U.S. PATENT DOCUMENTS

| | | | |
|---|---|---|---|
| 6,921,600 B2 | 7/2005 | Miyazawa et al. | |
| 2003/0087143 A1 | 5/2003 | Nakanishi et al. | |
| 2003/0235735 A1 | 12/2003 | Miyazawa et al. | |
| 2006/0040148 A1* | 2/2006 | Blunk et al. | 429/12 |
| 2006/0093735 A1 | 5/2006 | Cheng et al. | |
| 2006/0216571 A1* | 9/2006 | Vyas et al. | 429/38 |
| 2007/0117003 A1 | 5/2007 | Abd Elhamid et al. | |

FOREIGN PATENT DOCUMENTS

| | | |
|---|---|---|
| JP | 2003-068316 A | 3/2003 |
| JP | 2003-103529 A | 4/2003 |
| JP | 2003-109619 A | 4/2003 |
| JP | 2003-132913 A | 5/2003 |
| JP | 2003-282084 A | 10/2003 |
| JP | 2004-158346 A | 6/2004 |
| JP | 2005-302621 A | 10/2005 |
| JP | 2005-332775 A | 12/2005 |
| JP | 2005-339846 A | 12/2005 |
| JP | 2006-066139 A | 3/2006 |
| JP | 2006107862 A * | 4/2006 |
| JP | 2006-147173 A | 6/2006 |
| JP | 2006-164770 A | 6/2006 |
| JP | 2006-286202 A | 10/2006 |
| WO | WO 2007/021676 A2 | 2/2007 |

OTHER PUBLICATIONS

Machine translation of JP2000-223131 Publication Date: Nov. 8, 2000 Inventor: Ando Masaki.*
Abstract and machine translation of claims of JP 2000-223131 A, Aug. 11, 2000, Toyota Motor Corp.
Office Action of DE 10-2007-055-305.8-45 dated Jul. 13, 2010 and English translation thereof.

* cited by examiner

*Primary Examiner* — Patrick Ryan
*Assistant Examiner* — Brent Thomas
(74) *Attorney, Agent, or Firm* — Kenyon & Kenyon LLP

(57) ABSTRACT

A gas-impermeable fuel cell separator including ribs that form a gas flow passage, and a sealing section, wherein at least the gas flow passage has a hydrophilically treated surface, and in which the fuel cell separator base material is exposed within the sealing section.

2 Claims, 8 Drawing Sheets

FUEL CELL SEPARATOR, METHOD OF MANUFACTURING FUEL CELL SEPARATOR, AND FUEL CELL

PRIORITY INFORMATION

This application claims priority to Japanese Patent Application No. 2006-320745 filed on Nov. 28, 2006, which is incorporated herein by reference in its entirety.

BACKGROUND

1. Technical Field

The present invention relates to technology for a fuel cell separator, a method of manufacturing a fuel cell separator, and a fuel cell.

2. Related Art

A typical fuel cell comprises an electrolyte film, a pair of electrodes (an anode and a cathode) each comprising a catalyst layer and a diffusion layer, and a pair of fuel cell separators (an anode fuel cell separator and a cathode fuel cell separator) that sandwich the electrodes. During power generation by the fuel cell, in the case where the anode gas supplied to the anode is hydrogen gas and the cathode gas supplied to the cathode is oxygen gas, a reaction that produces hydrogen ions and electrons occurs at the anode, and the hydrogen ions pass though the electrolyte film to the cathode, while the electrons flow through an external circuit and reach the cathode. At the cathode, a reaction occurs in which the hydrogen ions, the electrons and the oxygen gas react together to produce water, and energy is emitted.

FIG. 1 is a schematic representation of the top view of a typical fuel cell separator used in a fuel cell. FIG. 2 is a schematic cross-sectional view of the fuel cell separator along the line A-A shown in FIG. 1. As shown in FIGS. 1 and 2, the fuel cell separator 1 comprises reaction gas inlets 11a and 11b, protruding ribs 12 that form a gas flow passage 10, reaction gas outlets 13a and 13b, and a sealing section 14. A reaction gas used during power generation by the fuel cell is introduced, for example, via the reaction gas inlet 11a, flows through the gas flow passage 10, and is discharged through the reaction gas outlet 13a.

The gas flow passage 10 functions not only as a passage for supplying the reaction gas to the electrode, but also as a drainage passage for draining the moisture produced during power generation by the fuel cell to a location outside the fuel cell system. Accordingly, if the drainage performance of the fuel cell separator 1 (and particularly the gas flow passage 10) is poor, then the moisture produced during power generation may accumulate within the gas flow passage 10, hindering supply of the reaction gas. As a result, the fuel cell separator 1 is usually subjected to a hydrophilic treatment in order to improve the drainage performance of the gas flow passage 10.

FIG. 3 is a series of diagrams describing a method of manufacturing a hydrophilically treated fuel cell separator. A fuel cell separator base material 16 is formed by mixing together a carbon material and a binder resin, and then pouring the resulting mixture into a mold and conducting press molding. The fuel cell separator base material 16 comprises a gas flow passage 10, ribs 12, and a sealing section 14.

As shown in FIG. 3, the fuel cell separator base material 16 is first subjected to shot blasting. Shot blasting is a technique in which particles of alumina or the like are blown at high-speed at the surface of the fuel cell separator base material 16, thereby abrading the surface of the fuel cell separator base material 16. Shot blasting removes the binder resin layer that exists at the surface of the fuel cell separator base material 16, and is able to reduce the contact resistance (the electrical resistance).

Subsequently, the shot blasted fuel cell separator base material 16 is washed and dried, and then subjected to a hydrophilic treatment, thereby forming a hydrophilically treated surface on the gas flow passage 10, the ribs 12 and the sealing section 14. Examples of suitable hydrophilic treatments include conventional methods such as fluorine gas treatments and plasma treatments. Following formation of the hydrophilically treated surface, the fuel cell separator base material 16 is washed and dried, yielding a fuel cell separator 1.

For example, Japanese Patent Laid-Open Publication No. 2005-339846 and Japanese Patent Laid-Open Publication No. 2003-109619 disclose fuel cell separators in which the fuel cell separator base material is subjected to a hydrophilic treatment to form a hydrophilically treated surface, and the hydrophilically treated surface formed on the top surface of the ribs is then removed.

However, in the fuel cell separators of these Japanese Patent Laid-Open Publications No. 2005-339846 and No. 2003-109619, a hydrophilically treated surface (or water repellent surface) is also formed on the sealing section of the fuel cell separator. This sealing section is the region that is bonded with an adhesive or the like during bonding of the fuel cell separators, the fuel cell separator and a gasket, or the fuel cell separator and a sealing plate. The hydrophilically treated surface formed on the sealing section inhibits polymerization with the adhesive, causing a reduction in the adhesive strength between the sealing section and the adhesive.

Particularly in the case of hydrophilic treatments conducted by fluorine gas treatment, if residual fluorine groups exist at the surface of the fuel cell separator sealing section, then the sealing section inhibits polymerization with the adhesive, causing a reduction in the adhesive strength between the sealing section and the adhesive.

Residual fluorine groups at the surface of the fuel cell separator sealing section can usually be partially removed by washing with water, but removal of the fluorine groups to a level that ensures favorable adhesion with adhesives is not always possible.

Although not related to the removal of the hydrophilically treated surface (or the fluorine groups) from a sealing section, Japanese Patent Laid-Open Publication No. 2004-158346 discloses a method of removing a release agent adhered to a fuel cell separator by irradiation with a laser.

Furthermore, although not related to the removal of the hydrophilically treated surface (or the fluorine groups) from a sealing section, Japanese Patent Laid-Open Publication No. 2003-282084 discloses a method of using shot blasting to selectively remove only the resin layer (the binder resin layer) on the top surfaces of the ribs.

However, the method of Japanese Patent Laid-Open Publication No. 2004-158346 also removes the hydrophilically treated surface from the gas flow passage of the fuel cell separator, meaning the drainage properties of the fuel cell separator tend to deteriorate. Furthermore, in the method of Japanese Patent Laid-Open Publication No. 2003-282084, the hydrophilically treated surface of the sealing section is not removed at all, meaning the adhesive strength at the sealing section cannot be ensured.

SUMMARY

The present invention provides a fuel cell separator that is capable of suppressing reduction in the adhesive strength between the fuel cell separator and an adhesive, while retaining favorable drainage properties for the fuel cell separator, and also provides a method of manufacturing such a fuel cell separator, and a fuel cell comprising such a fuel cell separator.

The present invention provides a gas-impermeable fuel cell separator comprising protruding ribs that form a gas flow passage, and a sealing section, wherein at least the gas flow passage has a hydrophilically treated surface, and in which the fuel cell separator base material is exposed within the sealing section.

The present invention also provides a gas-impermeable fuel cell separator comprising protruding ribs that form a gas flow passage, and a sealing section, wherein the gas flow passage has a hydrophilically treated surface, and in which the fuel cell separator base material is exposed at the top surfaces of the ribs and within the sealing section.

Furthermore, the present invention also provides a gas-impermeable fuel cell separator comprising protruding ribs that form a gas flow passage, and a sealing section, wherein the gas flow passage and the top surfaces of the ribs have hydrophilically treated surfaces, and in which the fuel cell separator base material is exposed within the sealing section.

Moreover, the present invention also provides a method of manufacturing a gas-impermeable fuel cell separator comprising protruding ribs that form a gas flow passage, and a sealing section, the method comprising: a hydrophilically treated surface formation step of forming a hydrophilically treated surface on at least the gas flow passage, the top surfaces of the ribs, and the sealing section; and a hydrophilically treated surface removal step of removing the hydrophilically treated surface formed on the top surfaces of the ribs and the sealing section.

Furthermore, the present invention also provides a method of manufacturing a gas-impermeable fuel cell separator comprising protruding ribs that form a gas flow passage, and a sealing section, the method comprising: a hydrophilically treated surface formation step of forming a hydrophilically treated surface on at least the gas flow passage, the top surfaces of the ribs, and the sealing section; a protective film formation step of forming a protective film on top of the hydrophilically treated surface of the gas flow passage, the top surfaces of the ribs, and the sealing section; and a hydrophilically treated surface removal step of removing the hydrophilically treated surface and the protective film formed on the top surfaces of the ribs and the sealing section.

Furthermore, the present invention also provides a method of manufacturing a gas-impermeable fuel cell separator comprising protruding ribs that form a gas flow passage, and a sealing section, the method comprising: a hydrophilically treated surface formation step of forming a hydrophilically treated surface on at least the gas flow passage, the top surfaces of the ribs, and the sealing section; a masking step of masking the gas flow passage and the top surfaces of the ribs; and a hydrophilically treated surface removal step of removing the hydrophilically treated surface formed on the sealing section.

Furthermore, in the above method of manufacturing a fuel cell separator, the hydrophilically treated surface is preferably formed by a fluorine gas treatment or a plasma treatment.

Moreover, in the above method of manufacturing a fuel cell separator, the protective film is preferably formed by applying a coating of a water-soluble resin.

Furthermore, in the above method of manufacturing a fuel cell separator, removal of the hydrophilically treated surface is preferably conducted by buffing.

Furthermore, in the above method of manufacturing a fuel cell separator, removal of the hydrophilically treated surface is preferably conducted by shot blasting or laser abrasion.

Furthermore, a fuel cell of the present invention comprises the fuel cell separator described above.

According to the present invention, because at least the gas flow passage has a hydrophilically treated surface, whereas the fuel cell separator base material is exposed within the sealing section, a fuel cell separator and a fuel cell that uses such a fuel cell separator can be provided that are capable of suppressing reduction in the adhesive strength between the fuel cell separator and an adhesive, while retaining favorable drainage properties for the fuel cell separator.

Furthermore, according to the present invention, by providing a method that comprises a hydrophilically treated surface formation step of forming a hydrophilically treated surface on at least the gas flow passage, the top surfaces of the ribs, and the sealing section; and a hydrophilically treated surface removal step of removing the hydrophilically treated surface formed on the top surfaces of the ribs and the sealing section, a method of manufacturing a fuel cell separator can be provided that is capable of suppressing reduction in the adhesive strength between the fuel cell separator and an adhesive, while retaining favorable drainage properties for the fuel cell separator.

DETAILED DESCRIPTION

As follows is a description of embodiments of the present invention.

First is a description of a fuel cell separator according to an embodiment of the present invention.

<Fuel Cell Separator>

Figure 1:
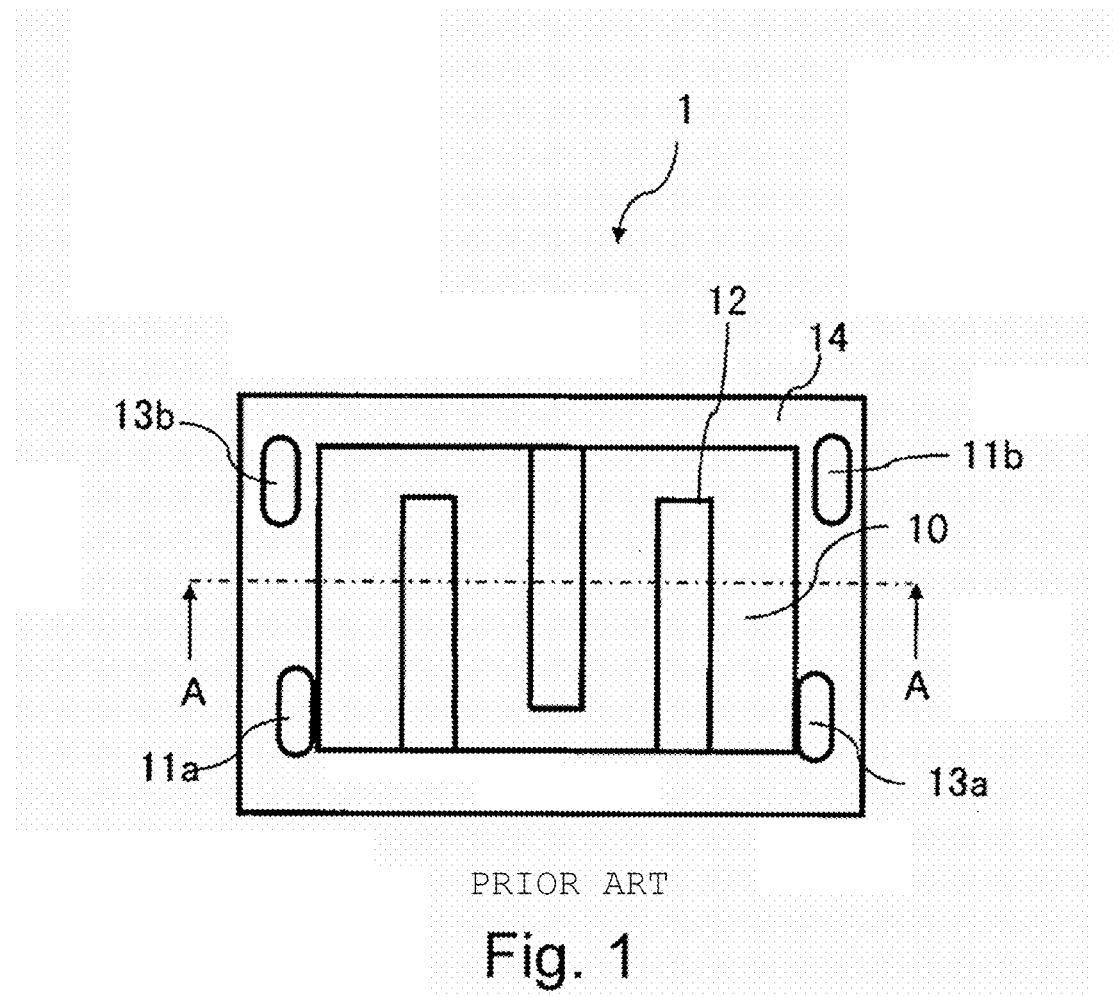
FIG. 1 is a schematic representation of the top view of a typical fuel cell separator used in a fuel cell.
Figure 2:
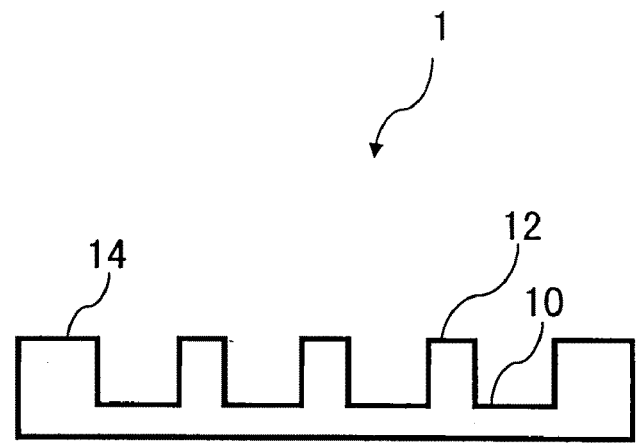
FIG. 2 is a schematic cross-sectional view of the fuel cell separator along the line A-A shown in FIG. 1.
Figure 5:
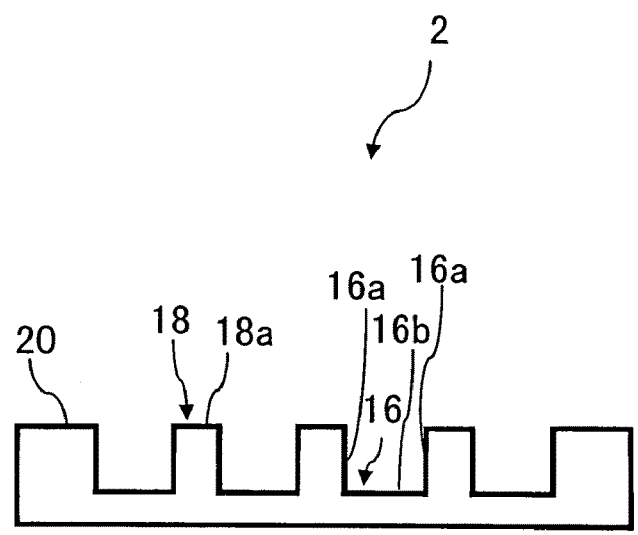
FIG. 5 is a schematic cross-sectional view of the fuel cell separator along the line A-A shown in FIG. 4.
Figure 3:
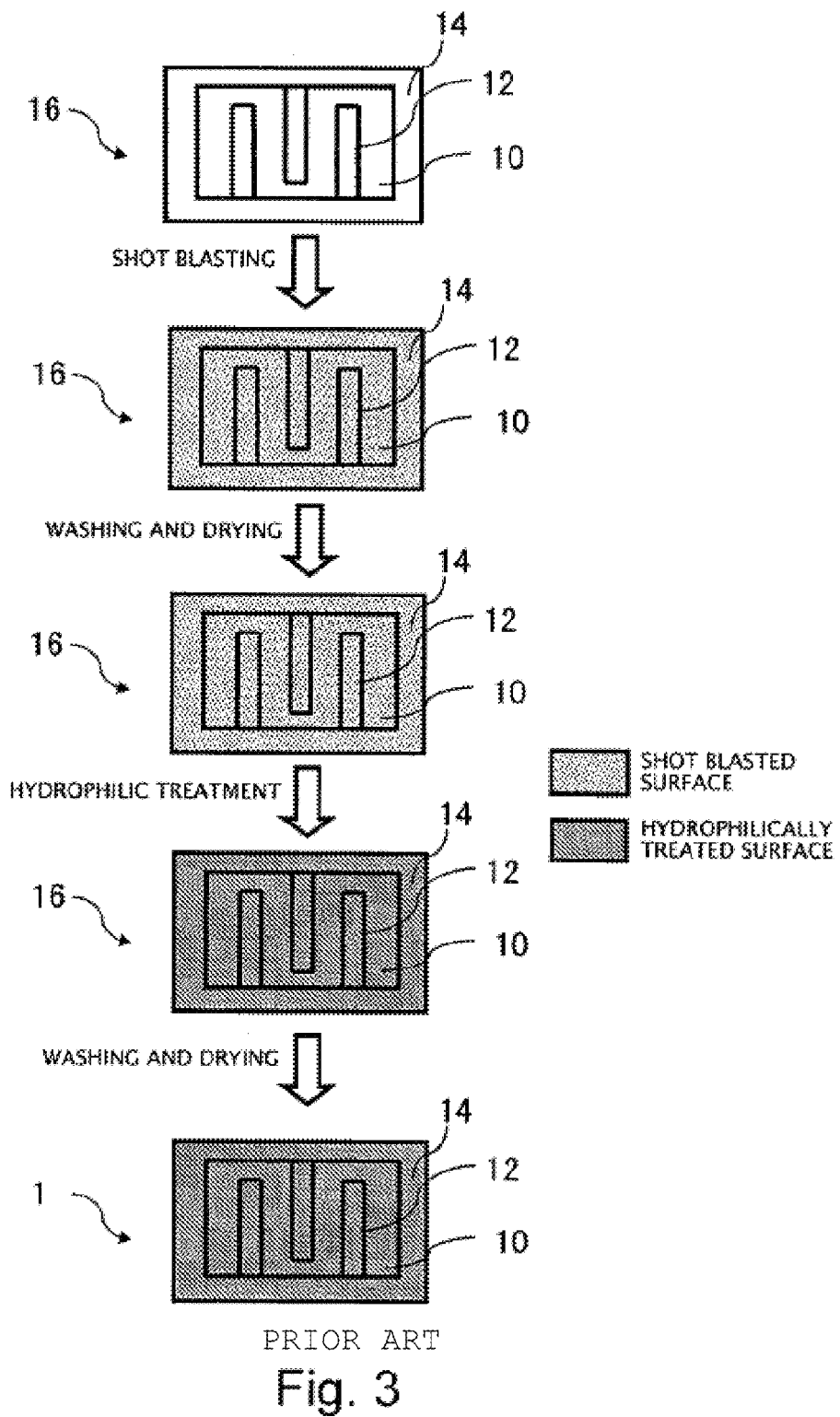
FIG. 3 is a series of diagrams describing a method of manufacturing a hydrophilically treated fuel cell separator.
Figure 4:
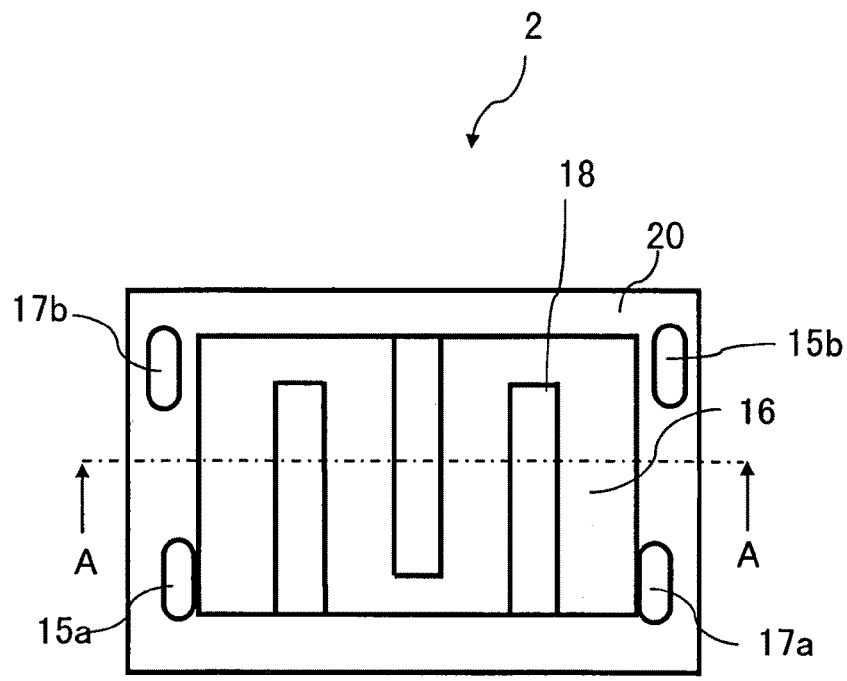
FIG. 4 is a schematic view showing an example of the structure of a fuel cell separator according to an embodiment of the present invention.

FIG. 4 is a schematic view showing an example of the structure of a fuel cell separator according to an embodiment of the present invention. FIG. 5 is a schematic cross-sectional view of the fuel cell separator along the line A-A shown in FIG. 4. As shown in FIGS. 4 and 5, a fuel cell separator 2 comprises reaction gas inlets 15a and 15b, reaction gas outlets 17a and 17b, protruding ribs 18 that form a gas flow passage 16, and a sealing section 20. The fuel cell separator 2 is gas-impermeable.

The term gas-impermeable means that the quantity of gas permeation (of hydrogen gas or nitrogen gas or the like) is no more than $1.0 \times 10^{-9}$ mol·m/m$^2$·sec·MPa, wherein this quantity can be measured in accordance with JIS K7126 (method A).

A reaction gas used during power generation by the fuel cell is introduced, for example, via the gas inlet 15a, flows through the reaction gas flow passage 16, and is discharged through the reaction gas outlet 17a. The reaction gas flow passage 16 functions not only as a passage for supplying the reaction gas to the fuel cell electrode, but also as a drainage passage for draining the moisture produced during power generation by the fuel cell to a location outside the fuel cell system. The reaction gas may incorporate water vapor.

Both side wall surfaces 16a and a bottom surface 16b of the gas flow passage 16 are subjected to a hydrophilic treatment such as the fluorine gas treatment described below, and therefore have hydrophilically treated surfaces. The two side wall surfaces 16a of the gas flow passage 16 comprise either two side wall surfaces of the ribs 18, or one side wall surface of a rib 18 and one side surface of the sealing section 20. A hydrophilically treated surface refers to a surface that incorporates hydrophilic groups, and has a contact angle with water (namely, a water contact angle) of no more than 100°. This contact angle can be measured using a FAMAS Drop-Master 700 manufactured by Kyowa Interface Science Co., Ltd.

The sealing section 20 is the region that is bonded with an adhesive or the like during bonding of the fuel cell separators, the fuel cell separator and a gasket, or the fuel cell separator and a sealing plate. Furthermore, the sealing section 20 is also the region that is provided with a sealing material (such as a gasket or an adhesive) for inhibiting the movement of fluids (such as reaction gases or refrigerants) in a direction that intersects with (for example, is perpendicular to) the direction of lamination of the fuel cell.

The fuel cell separator base material is exposed within the sealing section 20. This exposed fuel cell separator base material refers to a material that contains almost none of the above hydrophilically treated surface, and exhibits a contact angle with water (namely, a water contact angle) of at least 100°. The method used for exposing the separator base material is described below.

The top surfaces 18a of the ribs 18 represent the regions that contact the diffusion layer that constitutes part of the fuel cell described below. The top surfaces 18a of the ribs 18 may be either subjected to a hydrophilic treatment such as the fluorine gas treatment described below, meaning they have a hydrophilically treated surface, or may be regions in which the fuel cell separator base material is exposed. If the top surfaces 18a have a hydrophilically treated surface, then the drainage properties of the diffusion layer are improved. In contrast, if the fuel cell separator base material is exposed, then flooding can be prevented.

The fuel cell separator base material refers to the material obtained by mixing together a carbon material and a binder resin, and then pouring the resulting mixture into a mold and conducting press molding.

There are no particular restrictions on the carbon material, and examples of suitable materials include artificial graphite, carbon black, Ketchen black, acetylene black, or a mixture thereof.

The binder resin may be either a thermosetting resin or a thermoplastic resin. Examples of suitable thermosetting resins include phenolic resins, epoxy resins, polycarbodimiide resins, urea resins, melamine resins, alkyd resins, unsaturated polyester resins, diallyl phthalate resins, silicon resins, and mixtures thereof.

Examples of suitable thermoplastic resins include polyethylene, polystyrene, polyvinyl chloride, polyvinylidene chloride, polyvinyl alcohol, polyacrylonitrile, polyacrylic acid, polyamide, polyester, polycarbonate, polyacetal, polyurethane, polyphenylene sulfide, polyimide, and mixtures thereof.

As described above, in the fuel cell separator of this embodiment, the gas flow passage has a hydrophilically treated surface, enabling suppression of the problem that arises when moisture produced during power generation by the fuel cell accumulates within the gas flow passage and hinders supply of the reaction gas. In contrast, in the sealing section, the fuel cell separator base material is exposed, which enables suppression of any reductions in the adhesive strength between the sealing section and an adhesive caused by factors such as an inhibition of polymerization with the adhesive.

Next is a description of a method of manufacturing a fuel cell separator according to an embodiment of the present invention.

<Method of Manufacturing Fuel Cell Separator>

A method of manufacturing a fuel cell separator according to this embodiment comprises: a hydrophilically treated surface formation step of forming a hydrophilically treated surface on at least the gas flow passage, the top surfaces of the ribs, and the sealing section; and a hydrophilically treated surface removal step of removing the hydrophilically treated surface formed on the top surfaces of the ribs and the sealing section.

Figure 6:
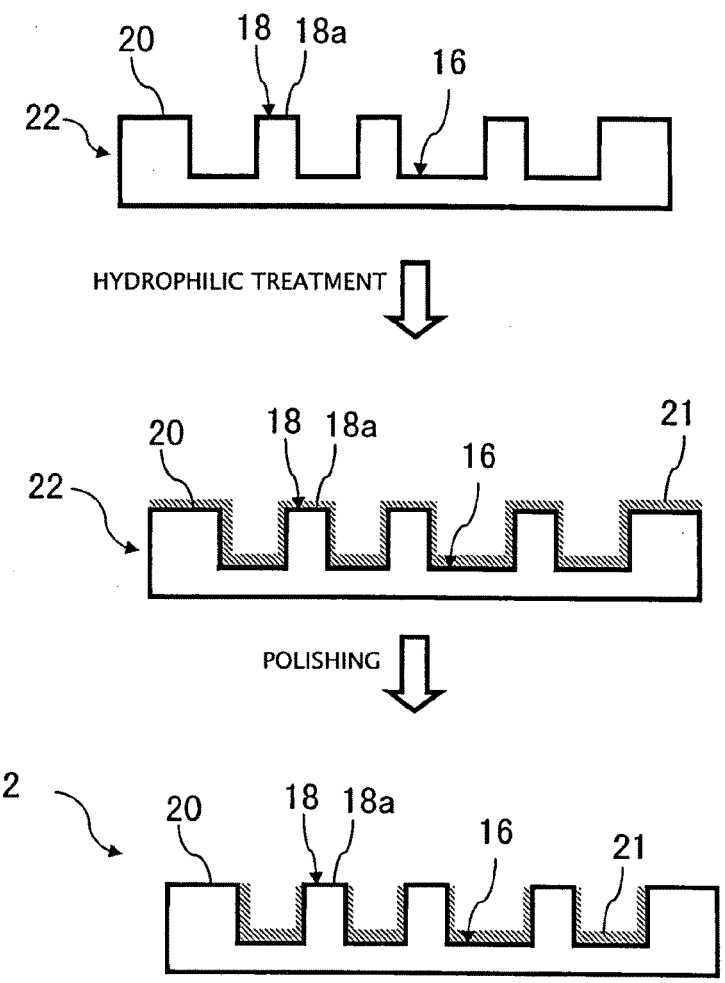
FIG. 6 is a series of diagrams describing a method of manufacturing the fuel cell separator according to this embodiment.

FIG. 6 is a series of diagrams describing the method of manufacturing a fuel cell separator according to this embodiment. A fuel cell separator base material 22 shown in FIG. 6 is obtained in the manner described above, by mixing together a carbon material and a binder resin, subsequently using the resulting mixture to fill a mold or the like and then conducting press molding or the like. The base material 22 comprises a gas flow passage 16, ribs 18, and a sealing section 20.

<Hydrophilically Treated Surface Formation Step>

First, as shown in FIG. 6, the fuel cell separator base material 22 is subjected to a hydrophilic treatment such as a fluorine gas treatment or plasma treatment, thereby forming a hydrophilically treated surface 21 on at least the gas flow passage 16, the top surfaces 18a of the ribs, and the sealing section 20.

The energy of the plasma, or the gas such as the fluorine gas or the like causes dissociation of intermolecular bonds within the binder resin that constitutes the fuel cell separator base material 22, and the dissociated molecular portions are oxidized by moisture and/or oxygen within the air, thereby forming a hydrophilically treated surface 21 that contains hydrophilic groups (COOH groups and OH groups). Conventional methods can be used for the plasma treatment or fluorine gas treatment, and there are no particular restrictions on the treatment conditions employed.

<Hydrophilically Treated Surface Removal Step>

The hydrophilically treated surface formed on the top surfaces of the ribs and the sealing section is removed using a polishing technique such as buffing. Polishing describes a technique in which surfaces at substantially the same height are removed by buffing or the like. As shown in FIG. 6, if the hydrophilically treated surface 21 is removed from the top surfaces 18a of the ribs 18 and the sealing section 20 by polishing, then the hydrophilically treated surface 21 (and the protective layer) formed on the gas flow passage 16, which is positioned at a lower location, undergoes almost no polishing.

Buffing describes a technique in which the fuel cell separator base material 22 is polished using a polishing material comprising a cloth or felt material to which particles of alumina or glass have been applied.

Next is a description of a method of manufacturing a fuel cell separator according to another embodiment of the present invention.

A method of manufacturing a fuel cell separator 1 according to this alternative embodiment of the present invention comprises: a hydrophilically treated surface formation step of forming a hydrophilically treated surface on at least the gas flow passage, the top surfaces of the ribs, and the sealing section; a protective film formation step of forming a protective film on top of the hydrophilically treated surface of the gas flow passage, the top surfaces of the ribs, and the sealing section; and a hydrophilically treated surface removal step of removing the hydrophilically treated surface and the protective film formed on the top surfaces of the ribs and the sealing section.

Figure 7:
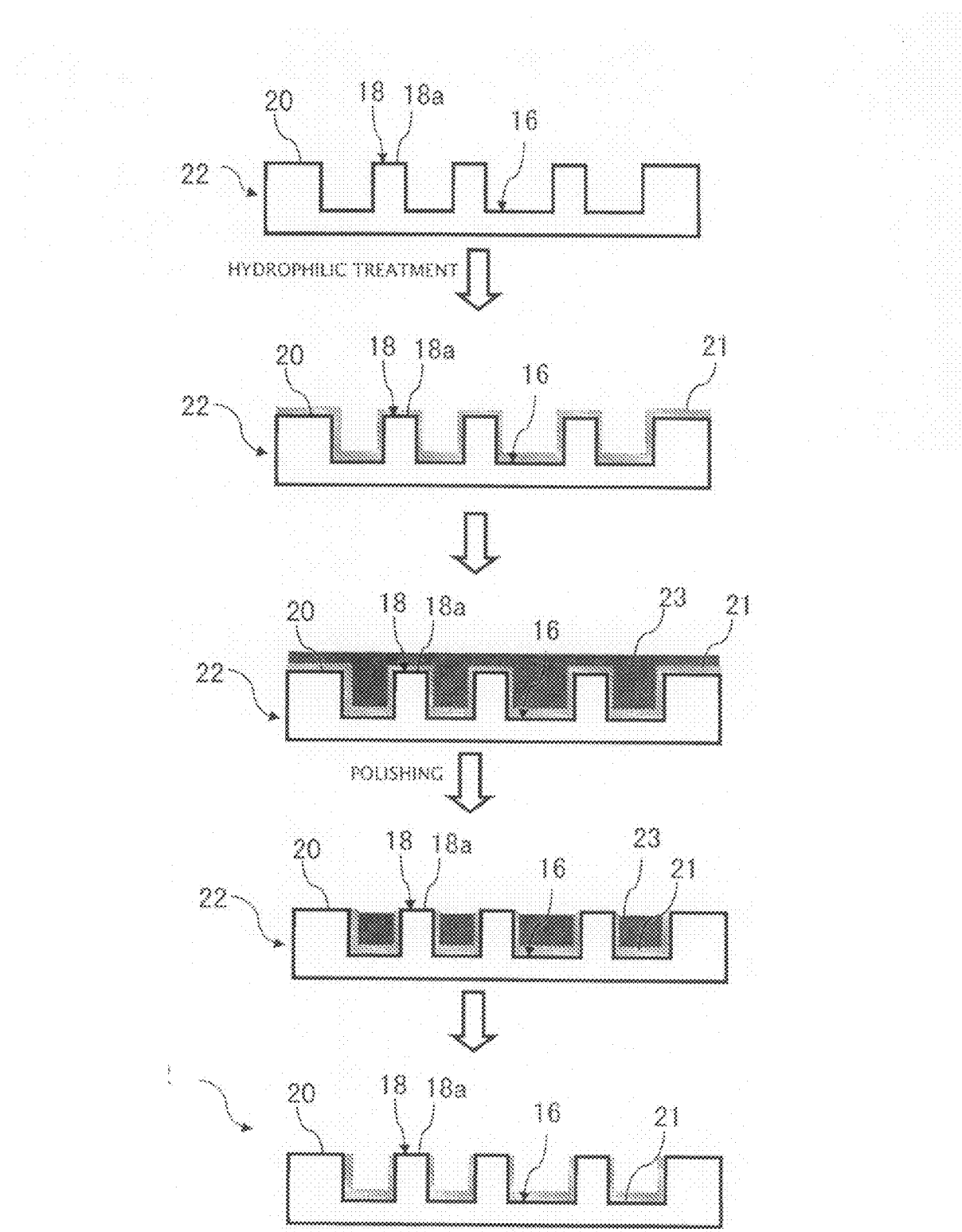
FIG. 7 is a series of diagrams describing a method of manufacturing the fuel cell separator according to another embodiment of the present invention.

FIG. 7 is a series of diagrams describing the method of manufacturing a fuel cell separator according to this alternative embodiment.

<Hydrophilically Treated Surface Formation Step>

The hydrophilically treated surface formation step can be conducted in the same manner as that described above.

<Protective Film Formation Step>

As shown in FIG. 7, a protective film 23 is formed on top of the hydrophilically treated surface 21 formed on top of the gas flow passage 16, the top surfaces 18a of the ribs 18, and the sealing section 20. There are no particular restrictions on the protective film 23, provided it fills the gas flow passage 16 and prevents the hydrophilically treated surface 21 formed on the gas flow passage 16 from being removed during the subsequent hydrophilically treated surface removal step. Furthermore, in terms of workability, the protective film 23 is preferably formed by applying a coating of a water-soluble resin.

The protective film 23 is formed by a technique such as dipping the fuel cell separator base material 22 in the water-soluble resin, or applying the water-soluble resin to the fuel cell separator base material 22.

Examples of the water-soluble resin include polyvinyl alcohol, modified cationized polyvinyl alcohol, cationized starch, oxidized starch, anionized starch, nonionized starch.

<Hydrophilically Treated Surface Removal Step>

As shown in FIG. 7, the hydrophilically treated surface 21 and the protective film 23 formed on the top surfaces 18a of the ribs 18 and the sealing section 20 are removed by polishing, using a technique such as buffing, shot blasting or laser abrasion. Here, polishing includes not only techniques in which surfaces at substantially the same height are removed (buffing), but also techniques in which a predetermined depth of surface is removed regardless of the height of the surface (shot blasting and laser abrasion).

Furthermore, polishing techniques such as shot blasting also remove the binder resin layer that exists at the top surfaces 18a of the ribs 18 and the surface of the sealing section 20, and can therefore reduce the contact resistance (the electrical resistance).

As shown in FIG. 7, the gas flow passage 16 is positioned at a lower location than the top surfaces 18a of the ribs 18 and the sealing section 20. Accordingly, even when the hydrophilically treated surface 21 and the protective film 23 formed on the top surfaces 18a of the ribs 18 and the sealing section 20 are removed by polishing, because the protective film 23 is retained within the gas flow passage 16, the hydrophilically treated surface 21 formed on the gas flow passage 16 undergoes almost no polishing at all.

Shot blasting is a technique in which particles of alumina, glass or silicon carbide or the like are blown at high speed at the fuel cell separator base material 22 using a shot blasting gun or the like, thereby abrading the base material. There are no particular restrictions on the shot blasting conditions such as the blow pressure of the shot blasting gun and the treatment time.

Furthermore, laser abrasion is a technique in which the fuel cell separator base material 22 is abraded by irradiation with a YAG laser or the like.

Following polishing via buffing, shot blasting or laser abrasion, the fuel cell separator base material is washed with water or the like. In those cases where the protective film uses a water-soluble resin such as those described above, water washing enables the protective film to be removed readily, even from within the gas flow passage. In those cases where the protective film is not water-soluble, washing is preferably conducted using a liquid capable of dissolving the protective film.

Next is a description of a method of manufacturing a fuel cell separator according to yet another embodiment of the present invention.

A method of manufacturing a fuel cell separator according to this alternative embodiment of the present invention comprises: a hydrophilically treated surface formation step of forming a hydrophilically treated surface on at least the gas flow passage, the top surfaces of the ribs, and the sealing section; a masking step of masking the gas flow passage and the top surfaces of the ribs; and a hydrophilically treated surface removal step of removing the hydrophilically treated surface formed on the sealing section.

Figure 8:
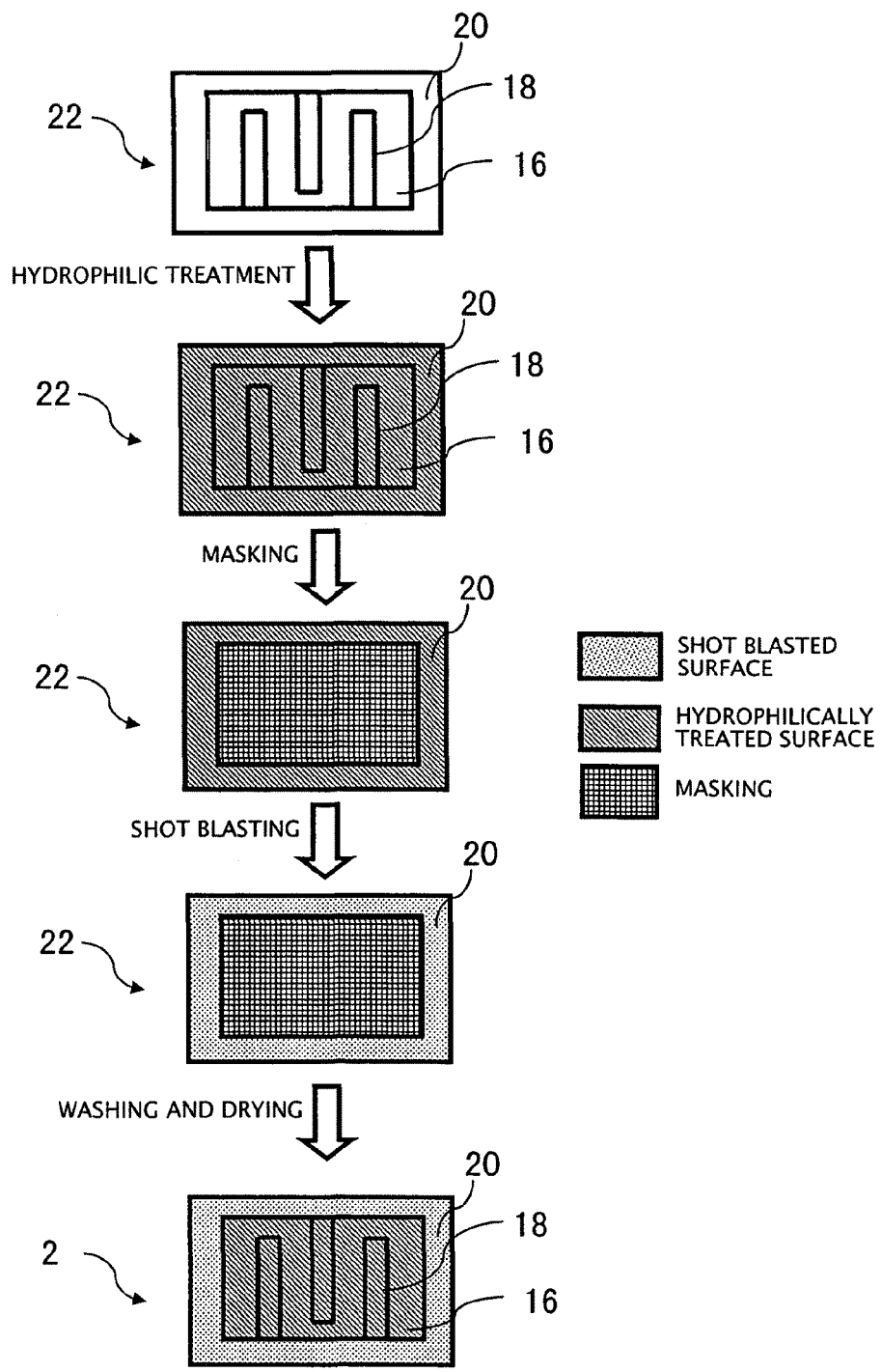
FIG. 8 is a series of diagrams describing a method of manufacturing the fuel cell separator according to yet another embodiment of the present invention.

FIG. 8 is a series of diagrams describing the method of manufacturing a fuel cell separator according to this alternative embodiment.

<Hydrophilically Treated Surface Formation Step>

The hydrophilically treated surface formation step can be conducted in the same manner as that described above.

<Masking Step>

As shown in FIG. 8, the gas flow passage 16 and the top surfaces of the ribs 18 are then masked. There are no particular restrictions on the masking, provided it is capable of preventing the hydrophilically treated surface formed on the gas flow passage 16 from being removed during the subsequent hydrophilically treated surface removal step. Masking describes the bonding of a tape (a masking tape) or a plate (a masking plate) or the like to the gas flow passage 16 and the top surfaces of the ribs 18.

There are no particular restrictions on the material of the masking tape or masking plate. Furthermore, from the viewpoint of achieving favorable adhesion when the masking tape or masking plate of the like is bonded to the gas flow passage and the top surfaces of the ribs, the gas flow passage and the top surfaces of the ribs are preferably washed and dried.

<Hydrophilically Treated Surface Removal Step>

The hydrophilically treated surface formed on the sealing section 20 is then removed by polishing, using an aforementioned buffing, shot blasting or laser abrasion technique or the like. As shown in FIG. 8, because the gas flow passage 16 and the top surfaces of the ribs 18 are protected with the masking tape or the like, the hydrophilically treated surface formed on the gas flow passage 16 and the top surfaces of the ribs 18 undergoes almost no polishing.

Furthermore, polishing techniques such as shot blasting also remove the binder resin layer that exists at the surface of the sealing section 20, and can therefore reduce the contact resistance (the electrical resistance).

Following the above polishing using a buffing, shot blasting or laser abrasion technique or the like, the fuel cell separator base material is washed with water or the like, and the masking tape is then removed.

In this manner, the method of manufacturing a fuel cell separator according to this embodiment employs a hydrophilic treatment using fluorine gas or the like to form a hydrophilically treated surface on the gas flow passage, thereby yielding a fuel cell separator that is capable of suppressing the problem that arises when moisture produced during power generation by the fuel cell accumulates within the gas flow passage and hinders supply of the reaction gas. Furthermore, by removing the hydrophilically treated surface formed on the sealing section (and the upper surfaces of the ribs) by conducting polishing using shot blasting or the like, the fuel cell separator base material is exposed within the sealing section, meaning a fuel cell separator is obtained that is capable of suppressing any reduction in the adhesive strength between the sealing section and the adhesive caused by factors such as an inhibition of polymerization with the adhesive.

Next is a description of a fuel cell comprising a fuel cell separator according to an embodiment of the present invention.

Figure 9:
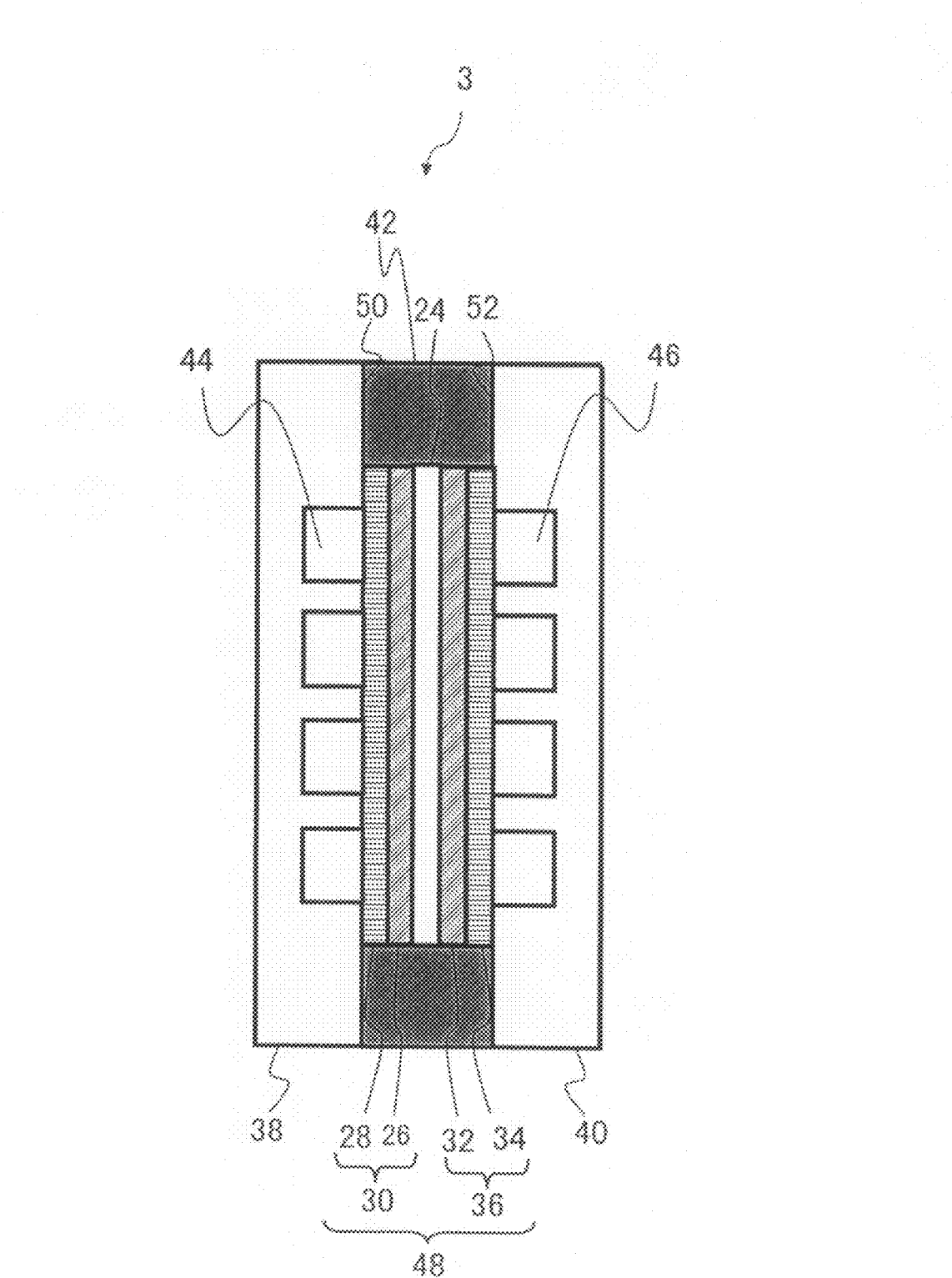
FIG. 9 is a schematic cross-sectional view showing an example of the structure of a fuel cell according to an embodiment of the present invention.

FIG. 9 is a schematic cross-sectional view showing an example of the structure of a fuel cell according to an embodiment of the present invention. As shown in FIG. 9, a fuel cell 3 comprises an electrolyte film 24, an anode 30 comprising an anode catalyst layer 26 and an anode diffusion layer 28, a cathode 36 comprising a cathode catalyst layer 32 and a cathode diffusion layer 34, an anode fuel cell separator 38, a cathode fuel cell separator 40, and a sealing material 42. In this embodiment, the anode fuel cell separator 38 and the cathode fuel cell separator 40 have the same structure as the fuel cell separator 2 described above. The hollow sections within the anode fuel cell separator 38 and the cathode fuel cell separator 40 represent an anode gas flow passage 44 for supplying an anode gas to the anode 30, and a cathode gas flow passage 46 for supplying a cathode gas to the cathode 36 respectively.

As shown in FIG. 9, the fuel cell 3 according to this embodiment comprises a film-electrode assembly 48, in which the anode 30 is formed on one surface of the electrolyte film 24 and the cathode 36 is formed on the other surface, with the two electrodes facing each other across the electrolyte film 24, and the anode fuel cell separator 38 and cathode fuel cell separator 40, which sandwich the film-electrode assembly 48 from both sides.

The sealing material 42 is provided so as to seal the two fuel cell separators. The sealing material 42 is formed, for example, by filling the region between a sealing section 50 of the anode fuel cell separator 38 and a sealing section 52 of the cathode fuel cell separator 40 with a thermosetting resin such as an epoxy-based resin, silicon-based resin or fluororesin, and subsequently curing the resin.

There are no particular restrictions on the electrolyte film 24 used in this embodiment, provided it prevents the transfer of electrons but exhibits proton conductivity. Examples of suitable electrolyte films include perfluorosulfonic acid-based resin films, copolymer films of trifluorostyrene derivatives, phosphoric acid-impregnated polybenzimidazole films, and aromatic polyetherketone sulfonic acid films. A specific example of a suitable film is Nafion (a registered trademark).

The anode catalyst layer 26 and the cathode catalyst layer 32 are formed by mixing together a metal catalyst such as platinum or ruthenium supported on carbon, and a perfluorosulfonic acid-based electrolyte or the like, and then conducting film formation onto the anode diffusion layer 28 and the cathode diffusion layer 34, or onto the electrolyte film 24. Examples of the carbon materials that can be used include carbon blacks such as acetylene black, furnace black, channel black and thermal black.

There are no particular restrictions on the materials for the anode diffusion layer 28 and the cathode diffusion layer 34, provided the materials exhibit a high level of conductivity and allow favorable diffusion of the reaction gas, although a porous conducting material is preferred. Suitable materials include porous carbon materials such as carbon cloth and carbon paper.

In the fuel cell of this embodiment produced in the manner described above, because the gas flow passages of the fuel cell separators exhibit hydrophilicity, the problem that arises when moisture produced during power generation by the fuel cell accumulates within the gas flow passage and hinders supply of the reaction gas can be effectively prevented. Furthermore, because the fuel cell separator base material is exposed within the sealing section, any reduction in the adhesive strength between the sealing section and the adhesive caused by factors such as an inhibition of polymerization with the adhesive can also be suppressed.

The fuel cell according to the above embodiment can be used, for example, as a small power source for use within a mobile device such as a mobile telephone or portable computer, as the power source for a vehicle, or as a domestic power source.

What is claimed is:

1. A gas-impermeable fuel cell separator, comprising:
   protruding ribs each having a top surface, the protruding ribs forming a gas flow passage, said ribs and gas flow passage having a base material comprising a binder resin; and
   a sealing section having a top surface corresponding to a region to be bonded to a sealing component, said sealing section having a base material comprising the binder resin,
   wherein the separator is treated by oxidizing portions of the base material of the gas flow passage, the sealing section, and the top surfaces of the protruding ribs such that hydrophilically treated surfaces which contain hydrophilic COOH groups and OH groups are formed, and
   wherein the base material is exposed throughout substantially the entire top surface of the sealing section by removing the hydrophilic treatment from the top surface of the sealing section, such that the base material contains substantially no hydrophilic treatment.

2. A fuel cell comprising the fuel cell separator according to claim 1.

* * * * *